United States Patent

[11] 3,578,841

| [72] | Inventor | William B. Elmer |
| | | 113 Pinckney St., Thornton, N.H. 02114 |
| [21] | Appl. No. | 690,970 |
| [22] | Filed | Dec. 15, 1967 |
| [45] | Patented | May 18, 1971 |

[54] REAR PROJECTION SCREEN
11 Claims, 2 Drawing Figs.

[52] U.S. Cl. ..................................... 350/127,
350/129
[51] Int. Cl. ...................................... G03b 21/60
[50] Field of Search ........................... 350/117-
—129, 259; 352/61

[56] References Cited
UNITED STATES PATENTS

| 2,258,164 | 10/1941 | Saint Genies | 352/61OX |
| 2,529,701 | 11/1950 | Maloff | 350/128 |
| 1,970,358 | 8/1934 | Bull et al. | 350/127 |
| 2,260,228 | 10/1941 | Moller et al. | 350/128OX |
| 2,351,033 | 6/1944 | Gabor | 352/58 |

FOREIGN PATENTS

| 670,611 | 1/1939 | Germany | 350/128 |
| 596,813 | 1/1948 | Great Britain | 350/127 |
| 750,911 | 6/1956 | Great Britain | 350/127 |

Primary Examiner—John M. Horan
Assistant Examiner—Monroe H. Hayes
Attorney—Charles Hieken

ABSTRACT: A rear projection screen has a rear surface that provides lens action for collimating incident light rays on essentially the entire screen surface into parallel rays directed essentially perpendicular to the front surface. The front surface is formed with a number of generally parallel closely spaced ribs that diverge incident light rays over a prescribed viewing angle so that anyone within the prescribed viewing angle sees the image projected on the screen with essentially equal brightness. For wide viewing angles the ribs are preferably arranged in clusters so that respective ribs in a cluster direct light rays to respective angular sectors of the viewing region.

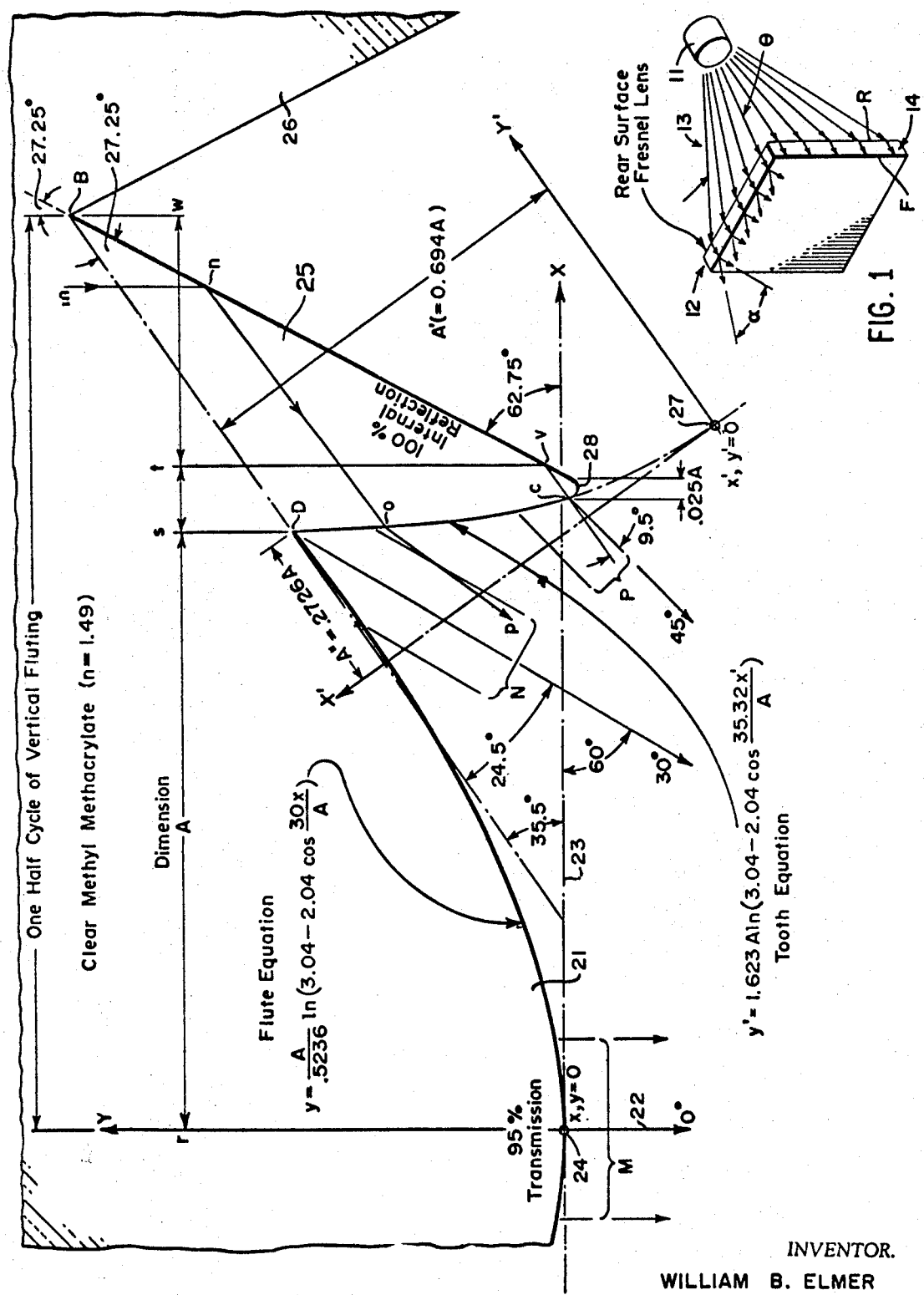

REAR PROJECTION SCREEN

BACKGROUND OF THE INVENTION

The present invention relates in general to optical projection systems having a projection screen illuminated from the rear, and more particularly concerns a novel rear projection optical screen system that delivers a bright image to an exceptionally wide angle viewing area with high efficiency.

A typical conventional rear projection screen is made of silk or translucent plastic treated so as to widely diffuse light striking the rear of the screen from the projector located to the rear to make the image visible throughout a wide solid angle so that many viewers congregated before the screen can observe the projected image. Such screens are inefficient and spread the light nonuniformly. Nearly half the incident light is reflected back toward the projector. Of that portion of the light which does pass through the screen to the viewers, more light energy is projected along the projector axis than elsewhere so that the closer an observer is to the projection axis, the brighter the image appears to him.

Accordingly, it is an important object of this invention to provide an efficient rear projection screen.

It is another object of this invention to achieve the preceding object while uniformly distributing the light across a relatively wide angle so as to avoid localized bright regions.

It is a further object of the invention to provide brighter rear projected images with a given level of projection power.

It is an object of the invention to achieve one or more of the preceding objects while providing a given intensity rear projected image with reduced projection power.

It is a further object of the invention to suppress annoying surface reflections often associated with a rear projection screen without impairing the transmission efficiency of the screen.

It is still a further object of the invention to improve efficiency by concentrating light rays in primarily the useful viewing region.

BRIEF SUMMARY OF THE INVENTION

According to the invention, a light ray transmissive screen comprises means defining a first surface having light collimating means, and means defining a second surface having light spreading means at the second surface. Typically the light collimating means comprises a Fresnel lens having a focal length for bringing the projected rays of light into substantial parallelism and directing them at the second surface. Typically the light spreading means comprises generally parallel closely spaced ribs of predetermined outline for spreading the collimated beam across a predetermined angle. Preferably the curved ribs comprise means for providing substantially equal distribution of light across the predetermined angle of spread. For wide angles the light spreading means comprises contiguous like sets of a number of unlike shaped ribs. In a form which the invention takes a rib comprises a curved and a flat surface in relatively acute angular relationship so arranged that the flat surface reflects essentially all incident light internally toward the curved surface. The second surface may include means defining a diffusing coating.

Numerous other features, objects and advantages of the invention will become apparent from the following specification when read in connection with the accompanying drawing in which:

BRIEF DESCRIPTION OF THE DRAWING

FIG. 1 is a pictorial representation of a rear projection system according to the invention illustrating the collimation of the rear surface and divergence of the front surface according to the invention; and FIG. 2 is a top view of a portion of the front surface of the screen helpful in understanding how to form rib sets for a 90° viewing angle.

DETAILED DESCRIPTION OF PREFERRED EMBODIMENTS

With reference now to the drawing and more particularly FIG. 1 thereof, there is shown a diagrammatic representation of a rear projection system according to the invention in which a projection lens 11, such as that associated with a slide or movie projector, illuminates a viewing screen 12 according to the invention having a rear surface designated R and a front surface designated F. Screen 12 comprises a solid transparent sheet material, such as clear methyl methacrylate having a Fresnel step condensing lens formed therein, and a front surface formed with a vertically-ribbed spreading lens to spread light uniformly throughout a specified horizontal viewing angle, designated $\alpha$.

Light emanates from the projection lens 11 throughout a horizontal angle $\Theta$ to illuminate the rear surface R. This incident light carries the variations in intensity and color for conveying the image to the screen.

At the rear surface R, the Fresnel ring pattern refracts the light into parallel rays 14 in accordance with well-known principles of operation of the Fresnel lens. All light passing through the body of the screen 12 thus travels in substantially parallel paths with very small angles of divergence. This angle is preferably so small that it may be neglected and corresponds substantially to the angle having its vertex at the screen and subtended by the width of the projection lens opening. Since the design and operation of a Fresnel zoned lens is well known, further discussion will not be included here. However, it is to be understood that other forms of collimating lenses may be used to establish the parallel rays incident upon the front surface F. It is also to be understood that the means defining the front surface F and the means defining the rear surface R may be separate lens elements that operate upon the light rays in accordance with the principles of the invention.

The front surface F of the screen is formed with vertical ribs shaped to refract and spread the light horizontally through a specified horizontal viewing angle $\alpha$. The vertical ribs are preferably closely spaced and thin in the horizontal direction and either substantially identical or arranged in identical sets so that each rib (or set of ribs) provides the entire lateral spread which may be required to provide viewing over the designated viewing angle $\alpha$. If this viewing angle is not too great; that is, less than about 60° identical closely spaced ribs are adequate. If the viewing angle is larger, it is preferred that the ribs be arranged in sets of an odd number with each rib in a set being different from the others, the extreme ribs in a set of three, for example, being mirror images of one another about the central rib. Where wide viewing angles are desired, the span of each set is preferably sufficiently small so that a viewer at an acceptable viewing distance is unable to resolve adjacent sets in much the same manner as a television viewer at a normal viewing distance is unable to resolve contiguous lines of a television raster.

Although each rib set spreads the light throughout the predetermined viewing angle, this spread does not take place with exact uniformity over each point of the rib surface. The ribs are lenticular, and light leaves the rib surface at one predominant angle only, at each point of the rib. A viewer at this predominant angle thus sees a restricted vertical band of light in each rib set that is different from the restricted vertical band of light seen in each rib set by a viewer at a different viewing angle. The complete image is created for the viewer by the aggregate of such vertical bands. By forming the ribs sufficiently fine and close, the viewer observes essentially a smooth continuous picture or image in much the same manner as the 525 horizontal lines on a television screen appear from a normal viewing distance to merge into a continuous picture or image.

A general equation that defines a curve corresponding to the bondary of the rib facing a viewer is given by the expression:

$$y = (A\psi') \ln(n - \cos\psi \, x/A)/(n-1) \quad (1)$$

where $x$ and $y$ are coordinates centered at the apex of the rib ($x$ being the horizontal or transverse coordinate);

$A$ is the width of one-half the rib;

$\psi'$ is the desired angle of spread from the centerline; and $n$ is the index of refraction of the transparent screen material.

The derivation of this equation is based upon the assumption that the light is spread uniformly (neglecting the small varying loss occurring because of internal reflection across the prescribed horizontal viewing angle $\psi'$). With a different assumption as to the light intensity distribution, such as assuming that light will be distributed with greater intensity near the center for applications where most of the viewers will be near the center of the screen, similar expressions may be developed by ordinary calculus for rib shapes producing an image that appears brighter to those viewers centered before the screen. Similarly, yet another expression could be developed for rib shapes which would project more light toward the edges of the prescribed viewing angle than toward the center. Such a distribution might be desirable in instances in which a large audience is arranged in a straight row before the projector. Then individuals at the ends of the row are located farther from the screen than those in the center and require more intense radiation in order to perceive an image that appears as bright as the image seen at the center. The details of applying the principles of this invention to choosing specific shapes for specific situations are within the skill of an optical worker of ordinary skill. As indicated above when the viewing angle $2\psi$ exceeds 60°, it is preferred that the ribs are arranged in sets instead of singularly to avoid excessive loss of light through internal reflection within the body of the screen.

It is well known that light passing from one medium to another suffers partial reflection and that the energy reflected increases as the angle of incidence increases in accordance with Fresnel's equation. For transparent plastic materials, the loss by reflection at the center of the rib is about 5 percent whereas the loss by reflection at the edge of the rib (for 30° ray bending) is about 15 percent. Thus the transmitted light viewed from 30° offcenter of the projection lens axis is about 0.9 of the intensity in the central region. As the light is bent further than 30°, the reflection loss rises more and more rapidly, leading to serious inefficiency.

Another feature of this invention materially reduces such internal reflection losses for wide viewing angles by adding another sharply pointed rib on either side of the main rib to define a set of three ribs.

Referring to FIG. 2, there is shown a view through a horizontal section of half a cycle of vertical fluting to illustrate the preferred surface curving of a specific example embodying the principles of the invention in which a set of three ribs comprises a central rib centered about a 0° viewing position between a pair of sharply pointed side ribs. Because the left side rib is the mirror image of the right-side rib about the 0° viewing line, only the right-side rib is illustrated in FIG. 2. This specific example spreads the light rays incident upon the rear surface R uniformly throughout a 90° horizontal angle centered about 0° angle so that the total image will appear substantially identical to all viewers before the screen within the 90° viewing angle.

The central rib 21 of a set is centered about the 0° viewing direction 22. It is convenient to define the viewing direction 22 as the Y axis and the tangent 23 to the rib 21 surface at the Y axis at point 24 as the X axis, the point 24 corresponding to the origin of this X—Y grid system where $x$ and $y$ equal 0. The flute equation for the surface is indicated from the point 24 to the point designated D where central rib 21 intersects with the sharp pointed right-side rib 25. The dimension A is the distance between points $r$ and $s$ and corresponds to half the width of the central rib 21 along the horizontal or X direction and is the distance between the Y axis 22 and the point D where the central rib joins the adjacent edge of right rib 25. Right rib 25 includes a portion of curved outline extending horizontally between points $s$ and $t$ and a portion of linear outline extending horizontally between points $t$ and $w$. The tip of right rib 25 is designated C. The outline BCD thus defines the shape of right rib 25. The additional rib on the left (not shown) is the mirror image of rib 25 about the Y axis 22.

The right rib 25 operates on light rays as follows. Consider a ray of light passing through the body of the screen and striking the sloping plance surface BC. This surface BC is arranged at such an angle that ray $m$ strikes it at an angle greater than the critical angle beyond which all light is reflected internally. Surface BC thus completely reflects ray $m$ internally along the path $n$—$0$. Upon reaching curved surface CD at point $0$, at an angle of incidence less than the critical angle, curved surface CD refracts this ray, and it leaves the surface in the direction $o$—$p$.

The system of rays parallel to $m$—$n$ through section $t$—$w$ of the screen all strike the sloping surface BC between points B and $v$ and are reflected equally to constitute a like but reversed system of rays parallel to $n$—$0$. These rays in turn strike the curved rib surface CD which refracts them and distributes them as a nonparallel ray system to fill out and complete the desired total viewing angle of the screen.

Since the concentration of light reflected from sloping surface BC is identical with that incident upon it, the reflected light striking curved surface CD is equal in concentration to the light striking the central rib 21 through section $r$—$s$. The same general equation is therefore applicable in determining the curve of surface CD but with respect to a translated and rotated coordinate system designated X' and Y' having an origin 27 with the Y' axis a distance A' from point D and the X' axis a distance A'' from point D as indicated.

In the specific example of FIG. 2, $\psi'$ is chosen as 30° for the central rib (total horizontal viewing angle is $2\psi'$, or 60°), and the screen material is methyl methacrylate having an index of refraction $n$=1.49. The equation (1) then becomes for the central rib $$y = 1.912 A \ln\left(3.04 - 2.04 \cos\frac{30x}{A}\right) \quad (2)$$

The dimension A is typically chosen so that for the size of the screen a viewer at the closest normal viewing distance is unable to resolve lines of light transmitted to him by contiguous sets of ribs. This distance A typically corresponds to the separation between contiguous horizontal lines on a television screen of comparable size.

To keep the auxiliary rib 25 as small and compact as possible, it is preferable to form it so that its slope at D is 90° to the plane of the screen; that is, as steep as possible without being reentrant. If reentrant, it would be difficult to remove the pressed pieces from the molding dies.

In the specific example light must leave the auxiliary rib 25 at its root at point D at an angle of 30° from the perpendicular to the plane of the screen in order to join the distribution of light from the central rib 21 at that point without an angular gap or overlap. Therefore, in accordance with Snell's law, $$\frac{\sin(90° - 30°)}{\sin \alpha} = n = 1.49 \quad (3)$$

where $\alpha$ is the angle of incidence within the auxiliary rib 25 at point D, this angle being 35.5° from the plane of the screen, or 54.5° from the normal to the screen. In order to reflect internally in this direction, the opposite plane surface B$v$ of rib 25 must slope at half 54.5°, or 27.25° from a perpendicular to the screen. Light is thus seen to strike the sloping rib surface BC at far more than the critical angle of incidence, and internal reflection will be total by an ample margin.

The coordinate system, $x'$, $y'$, in which the equation for the curve of the surface CD of the auxiliary rib 25 is defined must therefore be tilted at an angle of 54.5° from the plane of the screen as shown in FIG. 2. Since light must leave point D at 30° from the screen plane, it will leave point D at 54.5°−30°, or 24.5° from the new Y' axis passing through point 27. This angle corresponds to the viewing angle $\psi'$ for the equation of the curve CD based on the X'Y' axes. The distance A' between the Y' axis and point D may then be written as follows:

$$A' = .85A\frac{24.5}{30} = .694A \quad (4)$$

where 0.85A represents a reduction in intensity over the surface CD to match and exceed slightly the 0.90 reduction in light above shown to have taken place from the center to the edge of the center rib 21. The light intensity passing through CD is measured by A'. Since the angle at D is 24.5°, the width A' must be the width A reduced by the fraction 24.5°/30°.

The equation for curve CD can now be written with respect to the X'Y' axes with $x'$ the independent variable and $y'$ the dependent variable as $$y' = \frac{.694A}{24.5°} \ln\left(3.04 - 2.04 \cos\frac{24.5x'}{.694A}\right)$$

or $$y' = 1.623A \ln\left(3.04 - 2.04 \cos\frac{35.32x'}{A}\right) \quad (5)$$

The auxiliary rib 25 may now be constructed using equation (5) for the CD portion and the straight slope of 62.75° for the BC portion. These two portions are joined at the apex by a small rounded blunt end section 28 for mechanical and optical reasons. Alternately small fillets (not shown) may be included at both B and D for practical tooling considerations.

One-half of one rib set is thus shown extending from point $r$ to point $w$. Portion $r$—$s$ supplies the central rib 21 which light while portion $t$—$w$ supplies the auxiliary rib section 25. That light entering the screen between points $s$ and $t$ strikes the steep sloping surface CD and is reflected internally emerging at the blunt end 28. Rounding of this tip spreads this light usefully over the angular range of projection.

By duplicating the half of the rib set from Y axis 22 to point B on the left side, the entire three-rib set of this example may be established. These rib sets are repeated across the entire screen.

The vertical spread provided by the screen is relatively small, and as earlier stated, is substantially equal to the angle subtended by the opening of the projection lens and having a vertex on any point on the screen. For viewers arranged on a horizontal line before the screen not too far above or below the centerline of the projection lens, the invention provides each viewer with essentially the same image.

For applications where the viewers may be distributed through a substantial vertical as well as horizontal angle, such as in a lecture hall or auditorium with progressively stepped rows, it is desirable to provide vertical diffusion in addition. One way of accomplishing this is by forming the screen front with a similar array of horizontal ribs superimposed upon the vertical ribs and shaped to provide the desired intensity over the desired vertical angle. The screen would then appear to resemble a waffle iron somewhat.

Another method is to construct the screen in two separate layers, the Fresnel layer at the rear and the vertically ribbed layer in front. Either or both of the facing interior surfaces of the pair is then provided with horizontally extending spreading flutes shaped according to the same equations that have been described for the vertical flutes. The internal flutes would in general be limited to relatively small vertical angular spreads because large vertical spreads are seldom required and because substantial vertical bending of light before passing through the ribbed layer would distort the ray pattern. Yet another method is to add another separate ribbed panel before the rear projection screen as described, to provide vertical diffusion through a specified vertical angle.

However, since the vertical angle is usually not too great, it is usually sufficient to introduce diffusion by etching, sandblasting or coating with thin light-diffusing layers on the outer surface of the screen. Some slight diffusion may be desirable regardless of the vertical viewing angle, in order to relieve the sharpness of the light lines originating in the discrete ribs of the screen.

There has been described a novel rear projection system capable of efficiently directing a bright image to an audience distributed over a wide viewing angle. The structure is of such a nature that fabrication on a mass production basis is practical and economical. While a specific example of the invention has been described as a single screen sheet with the collimating lens formed in the rear surface and the dispersing means formed in the front surface, it is within the principles of the invention to employ separate collimating and dispersing members. For example, conventional and available Fresnel lenses may be used as separate rear members, and a sheet ribbed on the front surface only as the front member of the screen in a two element embodiment.

It is event that those skilled in the art may now make numerous other uses and modifications of and departures from the specific embodiments described herein without departing from the inventive concepts. Consequently, the invention is to be construed as embracing each and every novel feature and novel combination of features present in or possessed by apparatus and techniques herein disclosed and limited solely by the spirit and scope of the appended claims.

I claim:

1. Rear projection screen apparatus comprising, light collimating means on the rear surface of the screen for receiving diverging light rays from an image projector and collimating said rays into parallel rays representative of an image to be displayed by said screen, and light spreading means on the front surface of said screen for receiving said parallel rays from said light collimating means and deflecting respective ones of said rays to display said image with substantially uniform brightness over a wide viewing angle, said light spreading means comprising a plurality of closely spaced generally parallel ribs of curved outline defined in accordance with the following equation:

$y = (A/\psi') \ln (n - \cos \psi' x/A) / (n-1)$ where $x$ and $y$ are coordinates centered at the apex of the rib ($x$ being the horizontal or transverse coordinate);

$A$ is the width of one-half the rib;

$\psi'$ is the desired angle of spread from the centerline; and $n$ is the index of refraction of the transparent screen material.

2. Rear projection screen apparatus in accordance with claim 1 wherein said light collimating means is a Fresnel lens.

3. Rear projection screen apparatus in accordance with claim 1 wherein said ribs of curved outline each comprise one rib in contiguous like groups of a plurality of different ribs.

4. Rear projection screen apparatus in accordance with claim 3 wherein at least one rib in each of said groups comprises a curved and a flat surface in relatively acute angular relationship.

5. Rear projection screen apparatus in accordance with claim 4 wherein said curved and flat surface are positioned relatively so that said flat surface comprises means for reflecting substantially all incident light internally toward said curved surface, said curved surface comprising means coacting with said flat surface to refract light rays incident internally upon said curved surface from said flat surface.

6. Rear projection screen apparatus in accordance with claim 3 wherein each of said groups comprise a central rib of said curved outline comprising means for spreading light throughout a predetermined primary angle of spread and a pair of end ribs spreading additional light throughout additional secondary angles of spread contiguous with said primary angle.

7. Rear projection screen apparatus in accordance with claim 6 wherein said end ribs include internally reflecting surfaces comprising means for reflecting light rays internally incident thereon toward said central rib for refraction by another surface of each end rib into the associated secondary angle.

8. Rear projection optical apparatus in accordance with claim 1 and further comprising means for establishing diffusing characteristics upon said front surface.

9. Rear projection screen apparatus in accordance with claim 1 wherein said light collimating means and said light spreading means are on separate but closely adjacent members.

10. Rear projection screen apparatus in accordance with claim 9 and further comprising a second of said light spreading means on said front surface oriented to spread light through a different projection plane from that associated with said first light spreading means.

11. Rear projection screen apparatus in accordance with claim 10 in which said second light spreading means is oriented to spread light through a different projection plane that is 90° from that associated with said first light spreading means.